United States Patent
Li et al.

(10) Patent No.: US 11,902,346 B2
(45) Date of Patent: Feb. 13, 2024

(54) METHOD AND APPARATUS FOR PROCESSING STREAMING MEDIA SERVICE, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Shuo Li, Beijing (CN); Xuechao Wei, Beijing (CN); Yonggao Fu, Beijing (CN); Jiabing Leng, Beijing (CN); Yawen Liu, Beijing (CN); Mingfa Zhu, Beijing (CN); Feng Huang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/975,677

(22) Filed: Oct. 28, 2022

(65) Prior Publication Data
US 2023/0319124 A1  Oct. 5, 2023

(30) Foreign Application Priority Data
Mar. 22, 2022 (CN) .......................... 202210280690.5

(51) Int. Cl.
*H04L 65/61* (2022.01)
*H04L 65/1073* (2022.01)

(52) U.S. Cl.
CPC .......... *H04L 65/61* (2022.05); *H04L 65/1073* (2013.01)

(58) Field of Classification Search
CPC .............................. H04L 65/61; H04L 65/1073
(Continued)

(56) References Cited

U.S. PATENT DOCUMENTS

2012/0311116 A1* 12/2012 Jalan ..................... H04L 67/34
709/222
2016/0020947 A1   1/2016 Jalan et al.
(Continued)

FOREIGN PATENT DOCUMENTS

CN    103716681 A    4/2014
CN    106791931 A    5/2017
(Continued)

OTHER PUBLICATIONS

Extended European Search Report of European patent application No. 22206213.5 dated Jun. 13, 2023, 12 pages.
(Continued)

*Primary Examiner* — Glenford J Madamba
(74) *Attorney, Agent, or Firm* — Brooks Kushman P.C.

(57) ABSTRACT

The present disclosure provides a method and apparatus for processing a streaming media service, an electronic device, and a storage medium, and relates to the technical field of computers, particularly to technical fields such as industrial vision, deep learning, streaming media, and information flow. A specific implementation solution involves: acquiring registration information of an input source, the registration information including process information of a streaming media service process of the input source and streaming media address information of the input source; enabling the streaming media service process according to the process information; and controlling, by using the streaming media address information, the streaming media service process to process streaming media data of the input source.

18 Claims, 5 Drawing Sheets

(58) Field of Classification Search
USPC ........................................................ 709/231
See application file for complete search history.

(56) References Cited

U.S. PATENT DOCUMENTS

| | | | |
|---|---|---|---|
| 2017/0149606 A1 | 5/2017 | Jalan et al. | |
| 2017/0372165 A1* | 12/2017 | Jouhikainen | ........... G06V 10/70 |
| 2018/0152344 A1 | 5/2018 | Jalan et al. | |
| 2020/0065607 A1 | 2/2020 | Jouhikainen et al. | |
| 2021/0166054 A1 | 6/2021 | Jouhikainen et al. | |
| 2022/0030310 A1 | 1/2022 | Lu et al. | |
| 2023/0153697 A1 | 5/2023 | Jouhikainen et al. | |

FOREIGN PATENT DOCUMENTS

| | | | |
|---|---|---|---|
| CN | 111654674 A | | 9/2020 |
| CN | 111723727 A | * 9/2020 | ......... G06K 9/00718 |
| CN | 111723727 A | | 9/2020 |
| CN | 112261289 A | | 1/2021 |
| CN | 112965804 A | | 6/2021 |
| CN | 113225537 A | | 8/2021 |
| CN | 113285931 A | | 8/2021 |
| CN | 113923401 A | | 1/2022 |
| CN | 114051120 A | | 2/2022 |

OTHER PUBLICATIONS

Novell, 3 9 Guide, "iFolder 3.9.2 Deployment Guide", http://www.novell.com/documentation, Jun. 1, 2016 (Jun. 1, 2016), pp. 1-62, XP093051373, Retrieved from the Internet: URL:https://www.novell.com/documentation/ifolder3/pdfdoc/folder39_deployment/ifolder39_deployment.pdf, retrieved on Jun. 2, 2023], 62 pages.
Fujitsu et al., "Data Streaming support", ARC-2015-1956-DATA_STREAMING_SUPPORT.PPT, ONEM2M, vol. WG2—Architecture, ARC, Jul. 12, 2015 (Jul. 12, 2015), pp. 1-6, XP084012581, Retrieved from the Internet: URL:URL =http://member.onem2m.org/Application/documentapp/downloadimmediate/default.aspx?docID=12147, [retrieved on Jul. 12, 2015], 6 pages.

* cited by examiner

METHOD AND APPARATUS FOR PROCESSING STREAMING MEDIA SERVICE, ELECTRONIC DEVICE, AND STORAGE MEDIUM

CROSS-REFERENCE TO RELATED APPLICATIONS

The present application claims the priority of Chinese Patent Application No. 202210280690.5, filed on Mar. 22, 2022, with the title of "METHOD AND APPARATUS FOR PROCESSING STREAMING MEDIA SERVICE, ELECTRONIC DEVICE, AND STORAGE MEDIUM." The disclosure of the above application is incorporated herein by reference in its entirety.

FIELD OF THE DISCLOSURE

The present disclosure relates to the technical field of computers, particularly to technical fields such as industrial vision, deep learning, streaming media, and information flow.

BACKGROUND OF THE DISCLOSURE

Real time streaming means that collected audio and video data is transmitted over a network by using a real-time transmission protocol, and that anyone or device required to pay attention to a situation of a collection terminal can obtain the data in real time through the network. The real time streaming is an implementation of streaming media transmission. The implementation of the real time streaming is required to be based on dedicated streaming media service and transmission protocols.

Currently, streaming media services are generally implemented by building a plurality of services and components in the related art.

SUMMARY OF THE DISCLOSURE

The present disclosure provides a method and apparatus for processing a streaming media service, an electronic device, and a storage medium.

According to one aspect of the present disclosure, a method for processing a streaming media service is provided, including acquiring registration information of an input source, the registration information including process information of a streaming media service process of the input source and streaming media address information of the input source; enabling the streaming media service process according to the process information; and controlling, by using the streaming media address information, the streaming media service process to process streaming media data of the input source.

According to another aspect of the present disclosure, an electronic device is provided, including at least one processor; and a memory communicatively connected with the at least one processor; wherein the memory stores instructions executable by the at least one processor, and the instructions are executed by the at least one processor to enable the at least one processor to perform a method for processing a streaming media service, wherein the method includes acquiring registration information of an input source, the registration information including process information of a streaming media service process of the input source and streaming media address information of the input source; enabling the streaming media service process according to the process information; and controlling, by using the streaming media address information, the streaming media service process to process streaming media data of the input source.

According to still another aspect of the present disclosure, there is provided a non-transitory computer readable storage medium with computer instructions stored thereon, wherein the computer instructions are used for causing a method for processing a streaming media service, wherein the method includes acquiring registration information of an input source, the registration information including process information of a streaming media service process of the input source and streaming media address information of the input source; enabling the streaming media service process according to the process information; and controlling, by using the streaming media address information, the streaming media service process to process streaming media data of the input source.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF DRAWINGS

The accompanying drawings are intended to provide a better understanding of the solutions and do not constitute a limitation on the present disclosure. In the drawings.

DETAILED DESCRIPTION OF PREFERRED EMBODIMENTS

Figure 1:
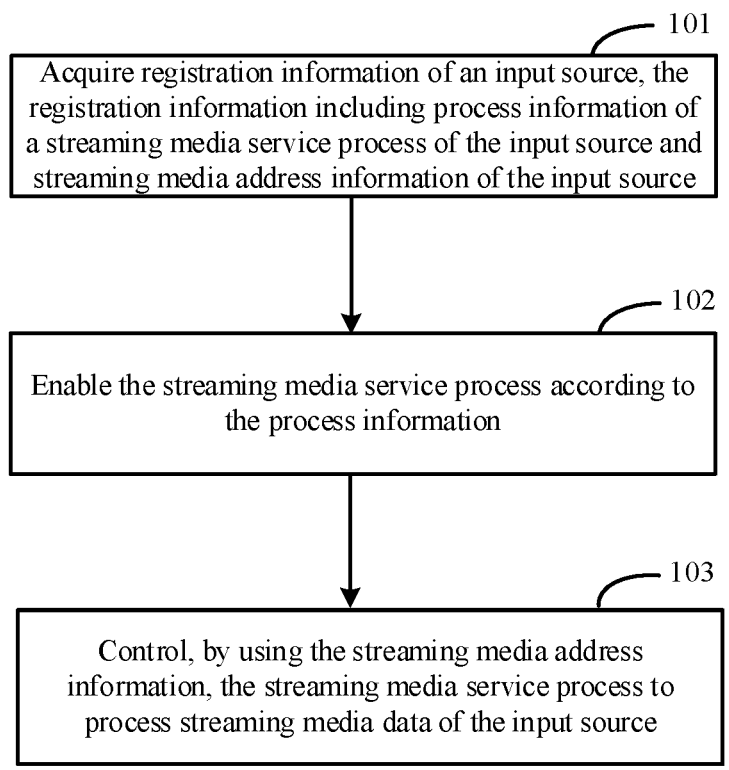
FIG. 1 is a schematic diagram according to a first embodiment of the present disclosure.

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

Obviously, the embodiments described are some of rather than all of the embodiments of the present disclosure. All other embodiments acquired by those of ordinary skill in the art without creative efforts based on the embodiments of the present disclosure fall within the protection scope of the present disclosure.

It is to be noted that the terminal device involved in the embodiments of the present disclosure may include, but is not limited to, smart devices such as mobile phones, Personal Digital Assistants (PDAs), wireless handheld devices, and tablet computers. The display device may include, but is not limited to, devices with a display function such as personal computers and televisions.

In addition, the term "and/or" herein is merely an association relationship describing associated objects, indicating that three relationships may exist. For example, A and/or B indicates that there are three cases of A alone, A and B together, and B alone. Besides, the character "/" herein generally means that associated objects before and after it are in an "or" relationship.

Streaming media refers to a media format, such as audio, video or multimedia files, that is played continuously and in real time over a network by using a streaming technology. The streaming media technology refers to a technology that compresses a series of media data and transmits the media data in segments by streaming, so as to realize real-time transmission of audio and video on the network for viewing. A main technical feature of the streaming media is streaming. The streaming is a general term for technologies of transmitting media over a network. The streaming is mainly implemented in two manners: progressive streaming and real time streaming.

The real time streaming means that collected audio and video data is transmitted over a network by using a real-time transmission protocol, and that anyone or device required to pay attention to a situation of a collection terminal can obtain the data in real time through the network. The real time streaming is an implementation of streaming media transmission. The implementation of the real time streaming is required to be based on dedicated streaming media service and transmission protocols.

Currently, streaming media services are generally implemented by building a plurality of services and components in the related art. For example, a streaming media service developed and customized based on an openCV software library and a plurality of components is to use an openCV-based Artificial Intelligence (AI) service to complete AI analysis on data after the streaming media service pulls data of an input source, and then send analyzed data to the streaming media service. The streaming media service uses a plurality of services and components to complete stream pushing of the streaming media service, so as to complete the entire streaming media service. However, the construction of the solution in the related art involves a plurality of services and components, which leads to cumbersome deployment and increases a risk of errors. Moreover, once a problem occurs, it is difficult to analyze and locate the problem. As a result, maintenance is difficult and service stability is low.

In addition, in the solution of the related art, since data is required to be sent back and forth between the streaming media service and the openCV-based AI service, a time delay becomes larger, and once a problem occurs in some intermediate link, the delay may be uncontrollable. Furthermore, video frames not in need of AI analysis in actual industrial production may be discarded, which may lead to poor smoothness of videos pushed by the streaming media service.

Therefore, there is an urgent need to provide a method for processing a streaming media service, which can effectively manage the streaming media service, thereby ensuring reliability of the streaming media service.

FIG. 1 is a schematic diagram according to a first embodiment of the present disclosure, as shown in FIG. 1.

In 101, registration information of an input source is acquired, the registration information including process information of a streaming media service process of the input source and streaming media address information of the input source.

In 102, the streaming media service process is enabled according to the process information.

In 103, the streaming media service process is controlled, by using the streaming media address information, to process streaming media data of the input source.

It is to be noted that the input source may include a device for collecting streaming media data such as audio, video or multimedia files. For example, the input source is a camera or the like. One or more input sources may be provided.

It is to be noted that the input source may be registered through a default interface of the streaming media service to generate the registration information of the input source.

It is to be noted that the process information of the streaming media service process of the input source may be a registration ID of the input source, for example, an input source ID.

It is to be noted that the streaming media address information of the input source may include an input address and an output address of the streaming media data of the input source. The input address of the streaming media data may be a network address of the streaming media data, that is, a Uniform Resource Locator (URL). The output address of the streaming media data may be an address with an input source ID.

It is to be noted that, after the streaming media data of the input source is processed, protocol encapsulation and saving may be performed on processed streaming media data by using a preset streaming media protocol.

It is to be noted that 101 to 103 may be partially or wholly performed by an application located in a local terminal, or a functional unit arranged in an application located in a local terminal such as a plugin or a Software Development Kit (SDK), or a streaming media server in a server located on a network side, or a distributed system located on the network side, such as a streaming media server or a distributed system on the network side, which is not particularly limited in this embodiment.

It may be understood that the application may be a native application (nativeApp) installed on the local terminal, or a web application (webApp) of a browser on the local terminal, which is not limited in this embodiment.

In this way, by acquiring registration information of an input source, the registration information including process information of a streaming media service process of the input source and streaming media address information of the input source, and then enabling the streaming media service process according to the process information, the streaming media service process can be controlled, by using the streaming media address information, to process streaming media data of the input source. Since the streaming media service process is enabled and controlled according to the registration information of the input source to process the streaming media data of the input source, the streaming media data of the input source can be processed using a separate streaming media service process, which realizes effective management for a process of processing the streaming media data of the input source, and can improve overall availability of the streaming media service, thereby ensuring reliability of the streaming media service.

Optionally, in one possible implementation of this embodiment, in 103, specifically, the streaming media service process may be controlled, by using the streaming media address information, to identify the streaming media data of the input source according to a preset image analysis model, so as to obtain identified streaming media data.

In the implementation, the preset image analysis model may be an image analysis model pre-trained according to a service requirement. The preset image analysis model may identify and analyze a video frame image in the streaming media data and obtain markup information required by the service.

For example, in an unmanned plant, a person in a collected video can be identified and marked by the preset image analysis model.

In one specific implementation process of this implementation, the streaming media service process may be controlled, by using the streaming media address information, to acquire the streaming media data of the input source, and then the streaming media service process may be controlled to identify the acquired streaming media data of the input source according to a preset image analysis model, so as to obtain the identified streaming media data.

In another specific implementation process of this implementation, prior to the controlling, by using the streaming media address information, the streaming media service process to identify the streaming media data of the input source according to a preset image analysis model, the streaming media service process may be first controlled to pre-process the streaming media data of the input source.

In the specific implementation process, the pre-processing may include decoding the streaming media data of the input source, and storing decoded streaming media data to a cache queue. At the same time, the decoded streaming media data is processed by frame extraction to obtain frame data, and then the frame data is identified according to the preset image analysis model to obtain a frame data identification result.

Specifically, between the obtaining a frame data identification result and the obtaining identified streaming media data, the frame data identification result and the streaming media data in the cache queue may also be rendered and fused, and rendering and fusion results are encoded to obtain the identified streaming media data.

Specifically, the frame data may include, but is not limited to, video frame images.

In this way, in the implementation, by controlling, by using the streaming media address information, the streaming media service process to identify the streaming media data of the input source according to a preset image analysis model, AI analysis and identification on the streaming media data of the input source are realized, streaming media data combined with AI analysis and identification results can be obtained, and at the same time, effective control over the identification on the streaming media data of the input source can be realized, thereby further ensuring the reliability of the streaming media service.

Moreover, by controlling, by using the streaming media address information, the streaming media service process to identify the streaming media data of the input source according to a preset image analysis model, the streaming media service can directly perform AI analysis and identification on the streaming media data of the input source without interactive transmission with other AI services. Therefore, the delay time caused by the interactive transmission between the streaming media service and the AI service in the related art can be prevented, and the processing time of the streaming media data can be effectively reduced.

In another specific implementation process of the implementation, after the obtaining identified streaming media data, the streaming media service process may be controlled, by using the streaming media address information, to output the identified streaming media data.

In the specific implementation process, the streaming media address information may include an output address of the streaming media data of the input source.

Specifically, the streaming media service process may be controlled according to the output address of the streaming media data of the input source to output the identified streaming media data, and then protocol encapsulation and saving may be performed on the outputted streaming media data by using a preset streaming media protocol, so that streaming media data corresponding to a received streaming media data acquisition request sent by a service server can be pushed to the service server according to the acquisition request.

For example, the preset streaming media protocol may include a Real Time Messaging Protocol (RTMP).

In this way, the streaming media service process can be controlled, by using the streaming media address information, to output the identified streaming media data, and the output of the streaming media data of the input source can be understood, which effectively manages the output of the streaming media data, thereby further ensuring the reliability of the streaming media service.

Optionally, in one possible implementation of this embodiment, in 103, specifically, the streaming media service process may be further controlled, by using the streaming media address information, to acquire the streaming media data of the input source.

In the implementation, the streaming media address information of the input source may include an input address of the streaming media data of the input source.

In one specific implementation process of the implementation, the streaming media service process may be controlled, according to an input address URL of the streaming media data of the input source, to acquire the streaming media data of the input source.

In the specific implementation process, the streaming media service process may be used to pull streaming media data on the input address URL according to the input address URL of the streaming media data of the input source.

In this way, the streaming media service process can be controlled, by using the streaming media address information, to acquire the streaming media data of the input source, and the acquisition of the streaming media data of the input source can be known, which effective manages the acquisition of the streaming media data, thereby further ensuring the reliability of the streaming media service.

Optionally, in one possible implementation of this embodiment, in 103, specifically, parameter information of the input source of a preset streaming media engine may be configured using the streaming media address information of the input source, and then the streaming media service process of the input source may be invoked according to the parameter information of the input source of the preset streaming media engine. That is, the streaming media service process is controlled to process the streaming media data of the input source.

In one specific implementation process of the implementation, for any input source, the streaming media address information of the input source can be used to configure relevant parameter information of the preset streaming media engine, and a streaming media service process in the preset streaming media engine can be invoked to process the streaming media data of the input source.

In the implementation, the preset streaming media engine may be an executable binary file, which may be invoked by a command line.

Specifically, the preset streaming media engine may be an engine built on a streaming application framework GStreamer. The GStreamer framework is a plugin- and pipeline-based system architecture, with good functional pluggability and easy expansion capability.

Here, the preset image analysis model may be used as a plugin in a pipeline. Thus, the streaming media service invokes a streaming media service process in the preset streaming media engine to realize AI analysis and identification on the streaming media data of the input source. The streaming media service can directly perform AI analysis and identification on the streaming media data of the input source without interactive transmission with other AI services. Therefore, the delay time caused by the interactive transmission between the streaming media service and the AI service in the related art can be prevented, and the processing time of the streaming media data, for example, video streaming, can be effectively reduced, so that a playback delay of a video pushed by the streaming media service can be reduced. That is, a playback delay of a streaming media player can be reduced.

Moreover, the streaming media service process can be controlled to multiplex encoding and decoding of the streaming media data based on the preset streaming media engine. Therefore, by multiplexing decoded video data, the number of times of encoding and decoding of the streaming media data is reduced, and the delay time can also be reduced.

It is to be noted that the multiple specific implementation processes of controlling the streaming media service process to perform data processing based on the preset streaming media engine according to the implementation can be combined with the multiple specific implementation processes of controlling the streaming media service process to perform data processing according to the foregoing implementation to implement the method for processing a streaming media service in this embodiment. A detailed description may be obtained with reference to relevant content in the foregoing implementation. Details are not described herein.

Optionally, in one possible implementation of this embodiment, after 103, the processing of the streaming media service process on the streaming media data of the input source may be further acquired, and then the streaming media service process may be managed according to the processing.

In the implementation, the processing may include, but is not limited to, connection establishment, failed acquisition, and a change from successful acquisition to failed acquisition, that is, processing interrupt, and a change from failed acquisition to connection establishment.

In one specific implementation process of the implementation, the streaming media service process of the input source is terminated if the processing is a change from successful acquisition to failed acquisition.

In another specific implementation process of the implementation, the streaming media service process is controlled, according to a preset cycle by using the streaming media address information, to acquire the streaming media data of the input source if the processing is failed acquisition.

In the specific implementation process, the streaming media service process may be controlled, based on the preset cycle according to an input address URL of the streaming media data of the input source, to acquire the streaming media data of the input source.

In the specific implementation process, the streaming media service process may be used to pull streaming media data on the input address URL based on the preset cycle according to the input address URL of the streaming media data of the input source. In the process, the processing may be a change from failed acquisition to connection establishment. It may be understood that, when the streaming media service process pulls the streaming media data on the input address URL, the processing may be successful acquisition. At the same time, the processing may be marked as successful acquisition.

It may be understood that the preset cycle may be a time cycle set according to an actual service requirement. For example, the preset cycle may be 2 s.

In this way, the streaming media service process can be managed according to the acquired processing of the streaming media service process on the streaming media data of the input source, data processing can be understood in a timely manner, and then the streaming media service process can be adjusted in a timely manner according to the data processing, so that the streaming media service can effectively manage the streaming media data processing process of the input source, thereby improving controllability of the streaming media service.

Moreover, the streaming media service process for failed acquisition can be terminated in a timely manner, and the streaming media service process for failed acquisition can be self-checked and recovered according to a certain cycle, so as to optimize resource utilization.

It is to be noted that the multiple specific implementation processes of managing the streaming media service process according to the implementation can be combined with the multiple specific implementation processes of controlling the streaming media service process to perform data processing according to the foregoing implementation to implement the method for processing a streaming media service in this embodiment. A detailed description may be obtained with reference to relevant content in the foregoing implementation. Details are not described herein.

Optionally, in one possible implementation of this embodiment, after 103, a remove instruction of the input source may be further acquired, and then according to the remove instruction, the streaming media service process of the input source may be terminated and the streaming media data of the input source may be removed.

In the implementation, the remove instruction of the input source may be acquired from a service server or a playback client.

In one specific implementation process of the implementation, the processing may include Removed. Further, according to the remove instruction, the streaming media service process of the input source is terminated, the streaming media data of the input source is removed, and the processing is marked as Removed.

Specifically, the streaming media data of the input source in a relevant database may be removed.

In this way, according to the acquired remove instruction of the input source, the streaming media service process corresponding to the input source can be terminated, and the streaming media data of the input source can be removed. Thus, the streaming media service can directly terminate the operation of pulling data without pulling the streaming media data of the input source and removing the streaming media data of the input source and without interacting with other services other than the streaming media service, which reduces complexity of the service processing process and improves composite performance of streaming media service functions.

Optionally, in one possible implementation of this embodiment, the streaming media service is deployed on each node in a streaming media service cluster.

In the implementation, the streaming media service implementing the method for processing a streaming media service may be deployed on nodes of the streaming media service cluster. The streaming media service may be a software architecture for implementing the method for processing a streaming media service.

In the implementation, the streaming media service cluster may include at least one master node and at least one slave node.

Specifically, the streaming media service implementing the method for processing a streaming media service may be deployed on at least one master node and at least one slave node in the streaming media service cluster. That is, the streaming media service is deployed on each node in the streaming media service cluster.

It may be understood that a streaming media server for implementing the method for processing a streaming media service in this embodiment may also be deployed on at least one master node and at least one slave node in the streaming media service cluster.

In one specific implementation process of the implementation, the streaming media service cluster may further include a database. The database may store relevant information of each node in the streaming media service cluster.

Specifically, during the enabling of any master node or slave node, role information and node information of the node may be stored in the database. During the operation, the slave node may periodically send relevant information such as current load capacity to each master node. A streaming media service request of a user may be forwarded to the corresponding slave node through the master node for processing.

In the implementation, a scheduling policy for a streaming media service in a specified streaming media service cluster may be configured based on an actual service application scenario.

Specifically, the scheduling policy for the streaming media service may include, but is not limited to, a centralized scheduling policy and an average scheduling policy.

Specifically, the centralized scheduling policy may be to preferentially schedule a slave node carrying a maximum number of stream paths and having a carrying capacity below an upper limit. The average scheduling policy may be to preferentially schedule a slave node carrying a minimum number of stream paths. Here, the number of stream paths may refers to the number of input sources, that is, the number of streaming media service requests from users.

In this way, a streaming media service with a composite service function can be deployed in a streaming media service cluster, cluster deployment can be supported by the streaming media service, and node expansion can be completed without affecting the use of the service. Moreover, time costs and an error rate of deployment of the streaming media service can be further reduced.

It is to be noted that the multiple specific implementation processes of controlling the streaming media service process to perform data processing according to the implementation can be combined with the multiple specific implementation processes of controlling the streaming media service process to perform data processing and the multiple specific implementation processes of managing the streaming media service process according to the foregoing implementation to implement the method for processing a streaming media service in this embodiment. A detailed description may be obtained with reference to relevant content in the foregoing implementation. Details are not described herein.

In this embodiment, by acquiring registration information of an input source, the registration information including process information of a streaming media service process of the input source and streaming media address information of the input source, and then enabling the streaming media service process according to the process information, the streaming media service process can be controlled, by using the streaming media address information, to process streaming media data of the input source. Since the streaming media service process is enabled and controlled according to the registration information of the input source to process the streaming media data of the input source, the streaming media data of the input source can be processed using a separate streaming media service process, which realizes effective management for a process of processing the streaming media data of the input source, and can improve overall availability of the streaming media service, thereby ensuring reliability of the streaming media service.

In addition, by use of the technical solution according to this embodiment, by controlling, by using the streaming media address information, the streaming media service process to identify the streaming media data of the input source according to a preset image analysis model, AI analysis and identification on the streaming media data of the input source are realized, streaming media data combined with AI analysis and identification results can be obtained, and at the same time, effective control over the identification on the streaming media data of the input source can be realized, thereby further ensuring the reliability of the streaming media service. Moreover, by controlling, by using the streaming media address information, the streaming media service process to identify the streaming media data of the input source according to a preset image analysis model, the streaming media service can directly perform AI analysis and identification on the streaming media data of the input source without interactive transmission with other AI services. Therefore, the delay time caused by the interactive transmission between the streaming media service and the AI service in the related art can be prevented, and the processing time of the streaming media data can be effectively reduced.

In addition, by use of the technical solution according to this embodiment, the streaming media service process can be controlled, by using the streaming media address information, to output the identified streaming media data, and the output of the streaming media data of the input source can be understood, which effectively manages the output of the streaming media data, thereby further ensuring the reliability of the streaming media service.

In addition, by use of the technical solution according to this embodiment, the streaming media service process can be managed according to the acquired processing of the streaming media service process on the streaming media data of the input source, data processing can be understood in a timely manner, and then the streaming media service process can be adjusted in a timely manner according to the data processing, so that the streaming media service can effectively manage the streaming media data processing process of the input source, thereby improving controllability of the streaming media service.

Moreover, the streaming media service process for failed acquisition can be terminated in a timely manner, and the streaming media service process for failed acquisition can be self-checked and recovered according to a certain cycle, so as to optimize resource utilization.

In addition, by use of the technical solution according to this embodiment, according to the acquired remove instruction of the input source, the streaming media service process of the input source can be terminated, and the streaming media data of the input source can be removed. Thus, the streaming media service can directly terminate the operation of pulling data without pulling the streaming media data of the input source and removing the streaming media data of the input source and without interacting with other services other than the streaming media service, which reduces complexity of the service processing process and improves composite performance of streaming media service functions.

In addition, by use of the technical solution according to this embodiment, a streaming media service with a composite service function can be deployed in a streaming media service cluster, cluster deployment can be supported by the streaming media service, and node expansion can be completed without affecting the use of the service. Moreover, time costs and an error rate of deployment of the streaming media service can be further reduced.

Figure 2:
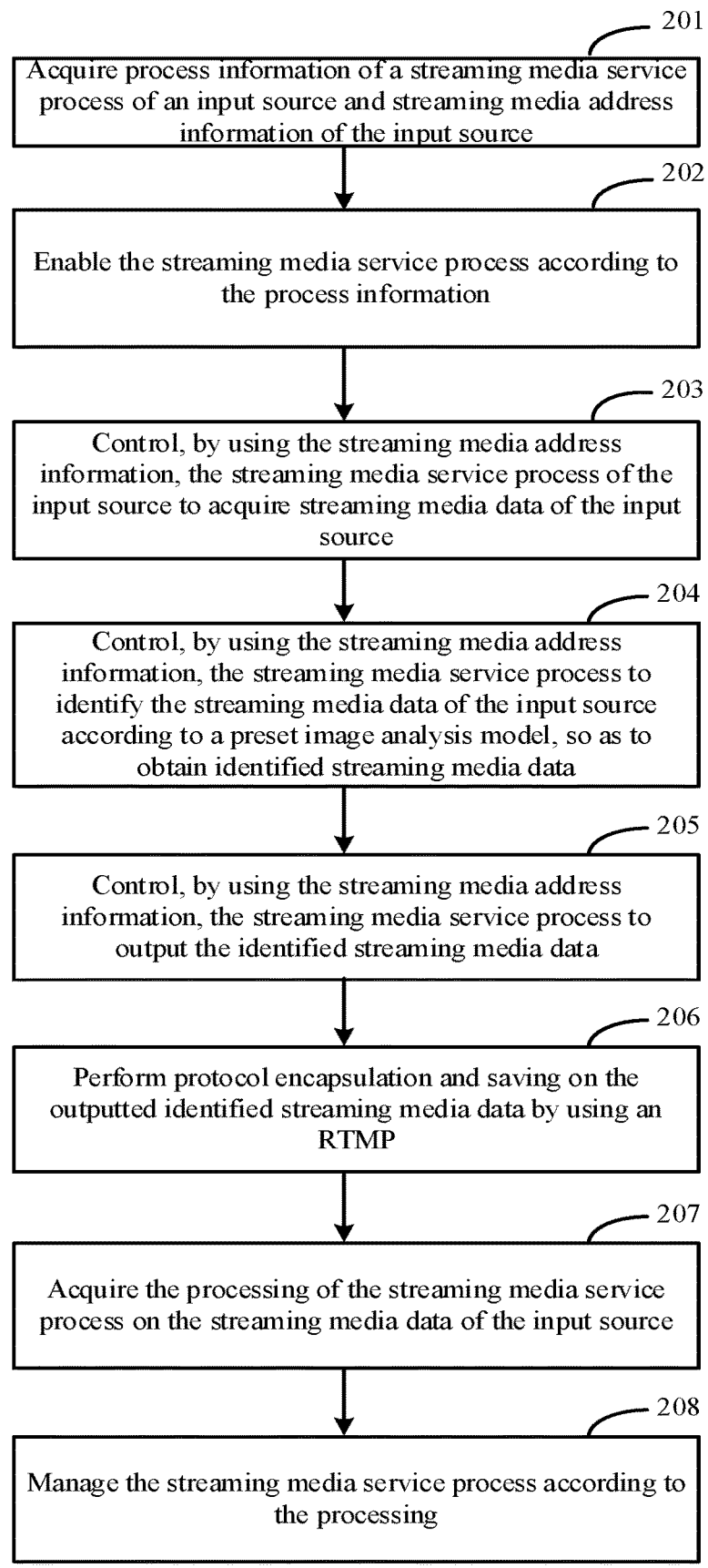
FIG. 2 is a schematic diagram according to a second embodiment of the present disclosure.

FIG. 2 is a schematic diagram according to a second embodiment of the present disclosure.

Figure 3:
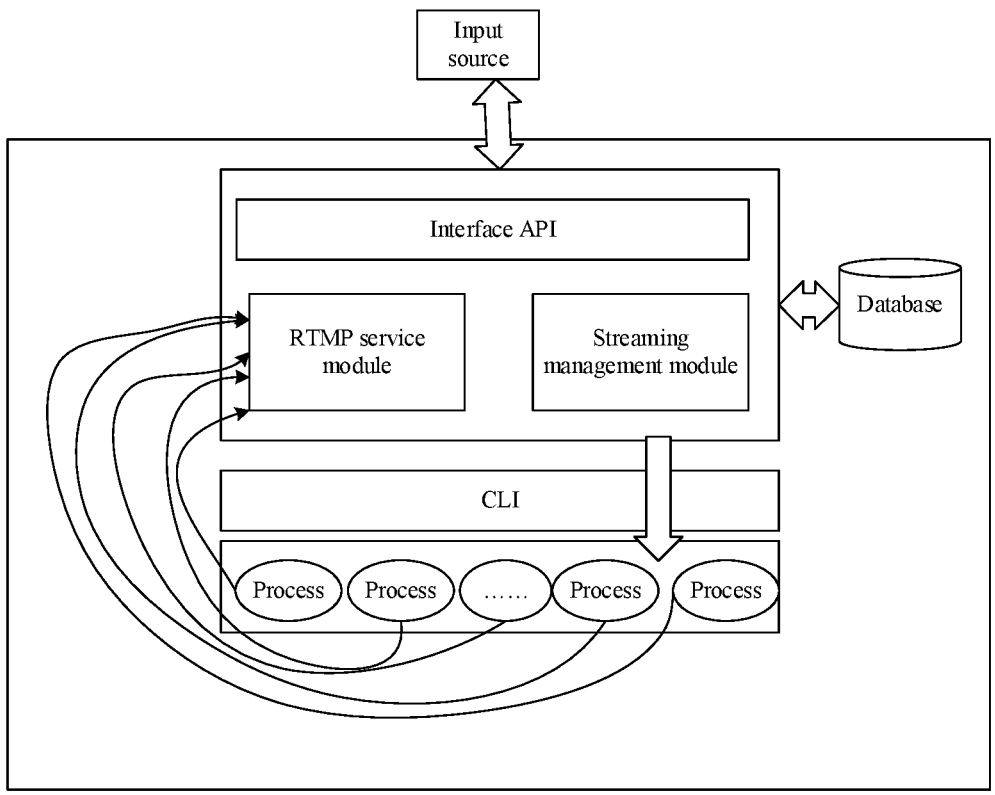
FIG. 3 is a schematic diagram of an architecture of a streaming media service according to the second embodiment of the present disclosure.

In this embodiment, FIG. 3 is a schematic diagram of an architecture of a streaming media service according to the second embodiment of the present disclosure. As shown in FIG. 3, the architecture of the streaming media service may include a streaming media service layer (server), a streaming media engine layer (engine), and a storage database. The streaming media service may be deployed on a streaming media server.

The streaming media service layer may include, but is not limited to, a streaming management module, an RTMP service module, and an Application Programming Interface (API).

The streaming media engine layer may be an executable binary file, which is invoked through a command-line interface (CLI). The streaming media engine layer may include a plurality of streaming media service processes.

Specifically, the streaming media engine layer may be the preset streaming media engine. A streaming media service process corresponding to the input source may be invoked by configuring parameter information of the input source of the preset streaming media engine. One streaming media service process may correspond to one input source.

The storage database may be used to store registration information of input sources, streaming media data of the input sources, and so on.

In 201, process information of a streaming media service process of an input source and streaming media address information of the input source are acquired.

In this embodiment, the input source may be registered with the streaming management module through the API of the streaming media service to generate registration information of the input source. The registration information includes the process information of the streaming media service process of the input source and the streaming media address information of the input source. The input source of the streaming media service may also be referred to as a source stream.

Specifically, the process information of the streaming media service process of the input source may be a registration ID of the input source, for example, an input source ID, i.e., a streamID.

The streaming media address information of the input source may include an input address of streaming media data of the input source and an output address of the streaming media data of the input source.

For example, the input address of the streaming media data of the input source may be a URL address. The output address of the streaming media data of the input source may be rtmp://xxxxx/streamID.

In 202, the streaming media service process is enabled according to the process information.

In 203, the streaming media service process of the input source is controlled, by using the streaming media address information, to acquire streaming media data of the input source.

Specifically, the streaming management module of the streaming media service layer invokes the streaming media service process of the input source by using the streaming media address information. The streaming media service process acquires the streaming media data of the input source according to the input address in the streaming media address information.

In 204, the streaming media service process is controlled, by using the streaming media address information, to identify the streaming media data of the input source according to a preset image analysis model, so as to obtain identified streaming media data.

Figure 4:
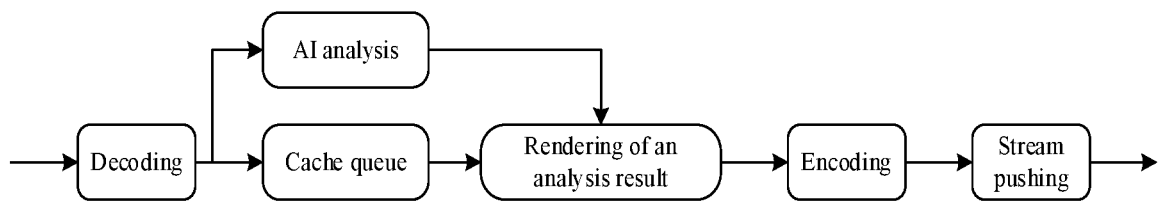
FIG. 4 is a schematic diagram of a principle of executing the streaming media service process according to the second embodiment of the present disclosure.

In this embodiment, FIG. 4 is a schematic diagram of a principle of executing the streaming media service process according to the second embodiment of the present disclosure.

As shown in FIG. 4, firstly, the streaming media service process may decode the streaming media data of the input source and store decoded streaming media data to a cache queue. Meanwhile, the decoded streaming media data is processed by frame extraction to obtain frame data.

Then, the frame data may be inputted to an AI analysis model, that is, a preset image analysis model, and an analysis result is outputted. Next, the analysis result and the decoded streaming media data in the cache queue are rendered and fused, and rendering and fusion results are encoded to obtain the identified streaming media data.

Finally, stream pushing is performed on the obtained identified streaming media data, and then the identified streaming media data may be outputted.

In this embodiment, the streaming media service process is a process based on a streaming media engine layer, that is, a process based on a preset streaming media engine. The preset streaming media engine may be an engine built on a GStreamer framework. The GStreamer framework may include a plugin and a pipeline. The preset image analysis model may be used as a plugin in the pipeline, to realize AI analysis and identification on the streaming media data of the input source.

In addition, here, the streaming media service invokes a streaming media service process separately for each input source to process the streaming media data. Thus, mutual interference between input sources can be effectively prevented. That is, if an input source fails, processing processes of other input sources may not be affected. In this way, fault isolation can be realized, thereby enhancing fault tolerance of the streaming media service.

In 205, the streaming media service process is controlled, by using the streaming media address information, to output the identified streaming media data.

In this embodiment, the identified streaming media data can be outputted to the RTMP service module of the streaming media service by using the output address in the streaming media address information.

In 206, protocol encapsulation and saving are performed on the outputted identified streaming media data by using an RTMP.

In this embodiment, the RTMP service module of the streaming media service may perform protocol encapsulation and saving on the outputted identified streaming media data by using the RTMP.

Optionally, the RTMP service module may further record the outputted identified streaming media data.

In 207, the processing of the streaming media service process on the streaming media data of the input source is acquired.

In 208, the streaming media service process is managed according to the processing.

In this embodiment, a core function of the streaming management module of the streaming media service is implemented by a state machine. A streaming management function of the streaming management module uses a standard registration mechanism. The input source is required to be registered with the streaming management module to obtain a streamID of the input source.

In addition, a user in need of the streaming media data of the input source may perform relevant operations on the streaming media data of the input source based on the streamID. For example, the streaming media data of the input source is accessed and acquired based on the streamID.

Figure 5:
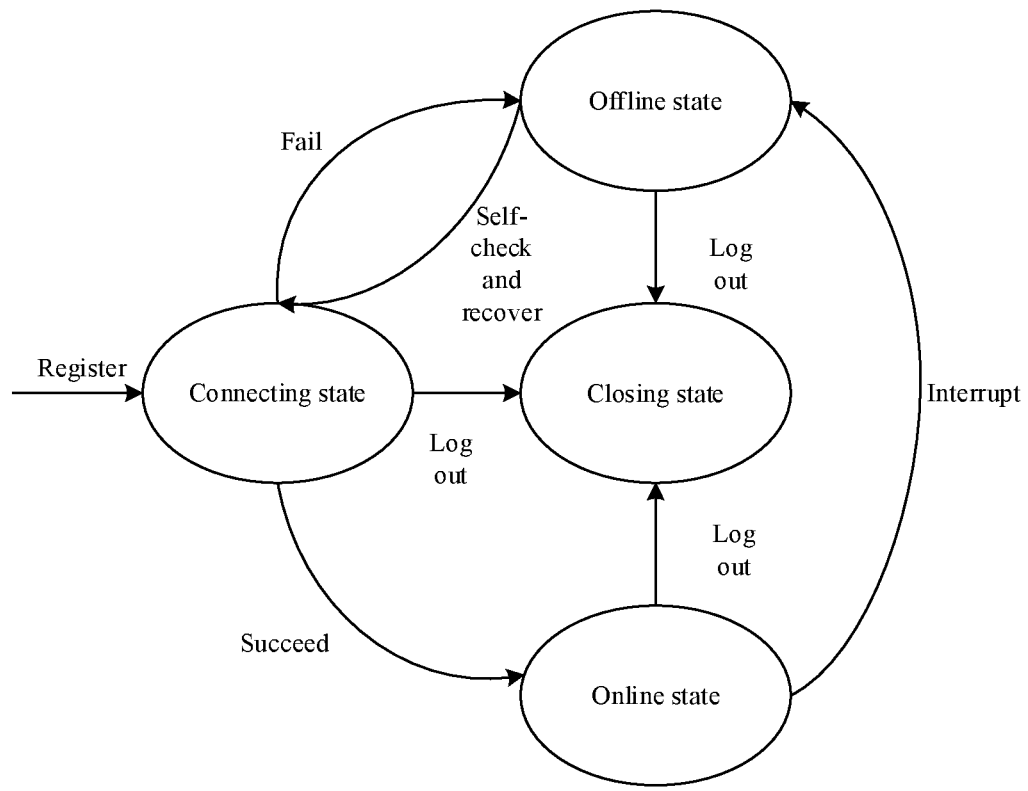
FIG. 5 is a schematic diagram of a principle of a state machine of a streaming management module according to the second embodiment of the present disclosure.

In this embodiment, FIG. 5 is a schematic diagram of a principle of a state machine of a streaming management module according to the second embodiment of the present disclosure.

In the streaming media service, streaming media data of one input source may mainly have the following four states, as shown in FIG. 5.

A connecting state refers to a process of establishing a connection between the streaming media service and the input source, in which a streaming media process of the streaming media engine is invoked by the streaming management module to acquire the streaming media data of the input source.

An online state refers to a state in which the streaming media service successfully acquires the streaming media data of the input source.

An offline state refers to a state in which the streaming media service fails to acquire the streaming media data of the input source.

A closing state refers to a state in which the input source is removed from the streaming media service.

Logout operations may be performed respectively in the connecting, online, and offline states, which may be switched to the closing state respectively. In the online state, if the processing is interrupted, the online state is switched to the offline state.

In this embodiment, the processing may include, but is not limited to, connection establishment, failed acquisition, and a change from successful acquisition to failed acquisition, that is, processing interrupt, and a change from failed acquisition to connection establishment.

Specifically, the processing of the streaming media service process on the streaming media data of the input source, that is, the operation of the input source in the streaming management module (state machine), may include the following content.

1. When one input source is registered with the streaming media service, an initial state is "connecting". That is, the processing is connection establishment.

2. The streaming management module acquires streaming media data of the input source by invoking a streaming media service process, and may push the streaming media data of the input source to the RTMP service module. If the streaming media data of the input source is acquired successfully, the state is changed to "online". That is, the processing is successful acquisition. Otherwise, the state is changed to "offline". That is, the processing is failed acquisition.

3. After the streaming media data of the input source is acquired successfully for the first time, that is, upon completion of the connection establishment, if the data cannot be continuously acquired due to a network fault or an input source fault, the state changes from "online" to "offline", the processing on the streaming media data of the input source is from successful acquisition to failed acquisition, and the streaming media service process corresponding to the input source is closed.

4. The streaming management module may self-check the input source whose state is "offline" according to a certain frequency and try to recover the state. In this case, the state changes from "offline" to "connecting", and the processing on the streaming media data of the input source is from failed acquisition to successful acquisition.

5. If the input source is required to be removed from the streaming media service, the state of the input source may be marked as "closing". The streaming management module may release resources such as the streaming media data of the input source in the state, and relevant records of the input source in the state are finally removed from the database.

It may be understood that the method for processing a streaming media service in this embodiment may be applied to scenarios including, but not limited to, industrial application scenarios, video and audio entertainment application scenarios, security application scenarios, and traffic application scenarios. The industrial application scenarios may not be limited to unmanned plant management, logistics storage management, and the like. The video and audio entertainment application scenarios may not be limited to live video broadcast, video playback, and the like.

Figure 6:
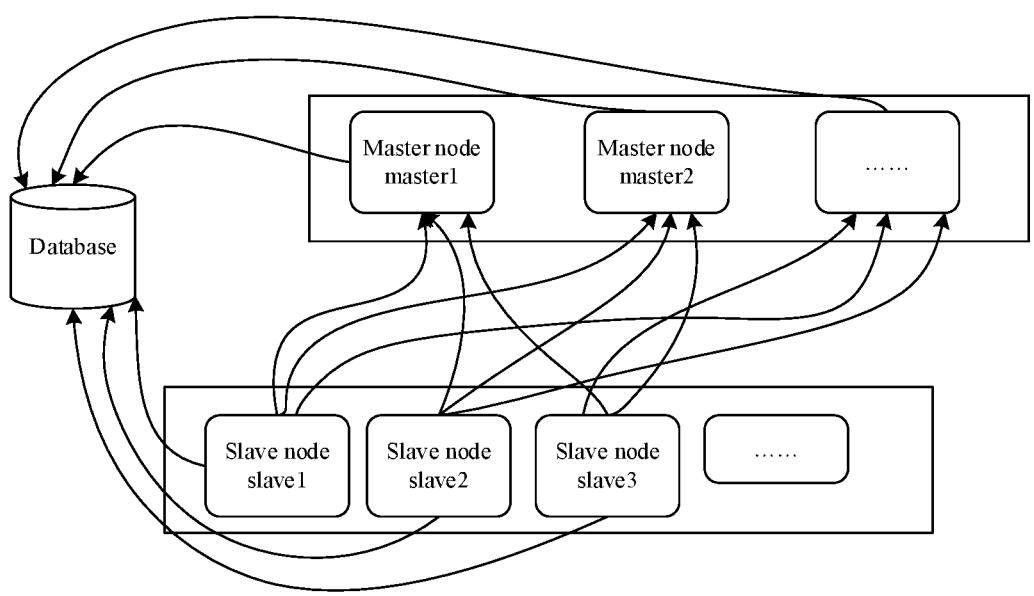
FIG. 6 is a schematic diagram of cluster deployment of a method for processing a streaming media service according to the second embodiment of the present disclosure.

FIG. 6 is a schematic diagram of cluster deployment of a method for processing a streaming media service according to the second embodiment of the present disclosure, as shown in FIG. 6.

In this embodiment, the method for processing a streaming media service may be applied to a streaming media service cluster. The streaming media service cluster may include a plurality of master nodes (master1, master2, . . . ), a plurality of slave nodes (slave1, slave2, slave3, . . . ), and a database for storing node information.

Specifically, the streaming media service implementing the method for processing a streaming media service may be deployed in the plurality of master nodes and the plurality of slave nodes of the streaming media service cluster. The streaming media service may be a software architecture for implementing the method for processing a streaming media service.

It may be understood that, a streaming media server for performing the method for processing a streaming media service in this embodiment may also be deployed in the plurality of master nodes and the plurality of slave nodes of the streaming media service cluster.

Specifically, when a master node or slave node is enabled, role information and node information thereof may be stored to the database.

During the operation, the slave node may periodically send relevant information such as current load capacity to the master node. A user request may be forwarded to the corresponding slave node through the master node for processing.

In this embodiment, a scheduling policy for a streaming media service in a specified streaming media service cluster may be configured based on an actual service application scenario.

Specifically, the scheduling policy may include, but is not limited to, a centralized scheduling policy and an average scheduling policy.

The centralized scheduling policy may be to preferentially schedule a slave node carrying a maximum number of stream paths and having a carrying capacity below an upper limit. The average scheduling policy may be to preferentially schedule a slave node carrying a minimum number of stream paths. Here, the number of stream paths may refers to the number of input sources.

In this embodiment, by acquiring registration information of an input source, the registration information including process information of a streaming media service process of the input source and streaming media address information of the input source, and then enabling the streaming media service process according to the process information, the streaming media service process can be controlled, by using the streaming media address information, to process streaming media data of the input source. Since the streaming media service process is enabled and controlled according to the registration information of the input source to process the streaming media data of the input source, the streaming media data of the input source can be processed using a separate streaming media service process, which realizes effective management for a process of processing the streaming media data of the input source, and can improve overall availability of the streaming media service, thereby ensuring reliability of the streaming media service.

In addition, by use of the technical solution according to this embodiment, a streaming management function and a streaming media data processing function can be integrated in the streaming media service, so that the streaming media service is basically independent of other external services.

In addition, by use of the technical solution according to this embodiment, the streaming media service may invoke a streaming media service process separately for each input source to process the streaming media data. Thus, mutual interference between input sources can be effectively prevented. That is, if an input source fails, processing processes of other input sources may not be affected. In this way, fault isolation can be realized, thereby enhancing fault tolerance of the streaming media service and improving overall availability of the streaming media service.

In addition, by use of the technical solution according to this embodiment, process information of a streaming media service process corresponding to an input source and streaming media address information of the input source can be acquired, and then the streaming media service process can be enabled according to the process information, so that the streaming media service process can be controlled to process streaming media data of the input source by using the streaming media address information. Thus, the process of processing the streaming media data of the input source can be controlled, and the streaming management function can be separated from the service, which can not only reduce the complexity of service implementation, but also make the functions of the streaming media service highly cohesive, so that streaming media components can be reused in various business scenarios and repetitive development costs can be reduced.

In addition, by use of the technical solution according to this embodiment, through built-in AI analysis capability in the streaming media service process, the streaming media service can perform AI analysis and identification on the streaming media data of the input source. The streaming media service can directly perform AI analysis and identification on the streaming media data of the input source without interactive transmission with other AI services. Therefore, the delay time caused by the interactive transmission between the streaming media service and the AI service in the related art can be prevented, and the processing time of the streaming media data, for example, video streaming, can be effectively reduced, so that a playback delay of a streaming media player can be reduced. Moreover, on the one hand, video frames of the streaming media data not required to be analyzed are not required to be discarded, which ensures smoothness of a video pushed by the streaming media service. On the other hand, if the AI analysis on a video frame takes too long, an analysis result of the video frame can be discarded to ensure that the delay of the video pushed by the streaming media service is controllable.

In addition, by use of the technical solution according to this embodiment, by deploying the streaming media service in a service cluster, the cluster can be supported, so that node expansion can be completed without affecting the use of the service. Besides, a deployment package of the streaming media service is required only to meet requirements of hardware and a system library version in terms of deployment, reducing time costs and an error rate of deployment of the streaming media service.

It is to be noted that, to make the description brief, the foregoing method embodiments are expressed as a series of actions. However, those skilled in the art should appreciate that the present disclosure is not limited to the described action sequence, because according to the present disclosure, some steps may be performed in other sequences or performed simultaneously. Next, those skilled in the art should also appreciate that all the embodiments described in the specification are preferred embodiments, and the related actions and modules are not necessarily mandatory to the present disclosure.

In the above embodiments, the descriptions of the embodiments have respective focuses. For a part that is not described in detail in one embodiment, refer to related descriptions in other embodiments.

Figure 7:
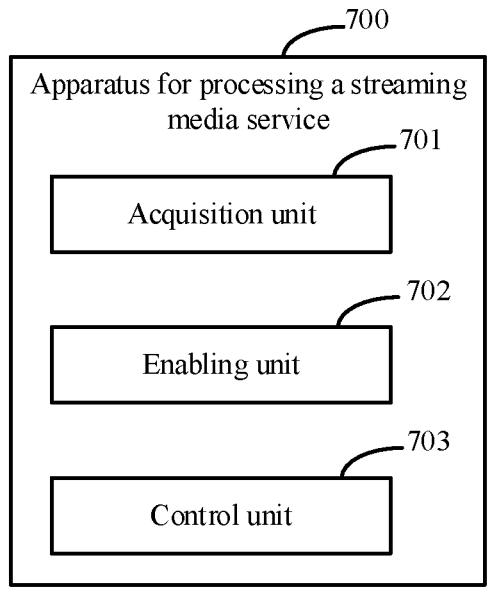
FIG. 7 is a schematic diagram according to a third embodiment of the present disclosure.

FIG. 7 is a schematic diagram according to a third embodiment of the present disclosure, as shown in FIG. 7. An apparatus 700 for processing a streaming media service in this embodiment may include an acquisition unit 701, an enabling unit 702, and a control unit 703. The acquisition unit 701 is configured to acquire registration information of an input source, the registration information including process information of a streaming media service process of the input source and streaming media address information of the input source. The enable unit 702 is configured to enable the streaming media service process according to the process information. The control unit 703 is configured to control, by using the streaming media address information, the streaming media service process to process streaming media data of the input source.

It is to be noted that the apparatus for processing a streaming media service in this embodiment may be partially or wholly an application located in a local terminal, or a functional unit arranged in an application located in a local terminal such as a plugin or an SDK, or a streaming media server in a server located on a network side, or a distributed system located on the network side, such as a streaming media server or a distributed system on the network side, which is not particularly limited in this embodiment.

It may be understood that the application may be a nativeApp installed on the local terminal, or a webApp of a browser on the local terminal, which is not limited in this embodiment.

Optionally, in one possible implementation of this embodiment, the control unit 703 may be specifically configured to control, by using the streaming media address information, the streaming media service process to identify the streaming media data of the input source according to a preset image analysis model, so as to obtain identified streaming media data.

Optionally, in one possible implementation of this embodiment, the control unit 703 is further configured to control, by using the streaming media address information, the streaming media service process to output the identified streaming media data.

Optionally, in one possible implementation of this embodiment, the control unit 703 is further configured to acquire the processing of the streaming media service process on the streaming media data of the input source; and manage the streaming media service process according to the processing.

Optionally, in one possible implementation of this embodiment, the control unit 703 may be specifically configured to terminate the streaming media service process of the input source if the processing is a change from successful acquisition to failed acquisition.

Optionally, in one possible implementation of this embodiment, the control unit 703 may be specifically configured to control, according to a preset cycle by using the streaming media address information, the streaming media service process to acquire the streaming media data of the input source if the processing is failed acquisition.

Optionally, in one possible implementation of this embodiment, the control unit 703 may be further configured to acquire a remove instruction of the input source; and terminate the streaming media service process of the input source and remove the streaming media data of the input source according to the remove instruction.

Optionally, in one possible implementation of this embodiment, the streaming media service is deployed on a node in a streaming media service cluster.

Optionally, in one possible implementation of this embodiment, the streaming media service cluster includes at least one master node and at least one slave node.

In this embodiment, the acquisition unit acquires registration information of an input source, the registration information including process information of a streaming media service process of the input source and streaming media address information of the input source, and then the enabling unit may enable the streaming media service process according to the process information, so that the control unit can control, by using the streaming media address information, the streaming media service process to process streaming media data of the input source. Since the streaming media service process is enabled and controlled according to the registration information of the input source to process the streaming media data of the input source, the streaming media data of the input source can be processed using a separate streaming media service process, which realizes effective management for a process of processing the streaming media data of the input source, and can improve overall availability of the streaming media service, thereby ensuring reliability of the streaming media service.

In addition, by use of the technical solution according to this embodiment, by controlling, by using the streaming media address information, the streaming media service process to identify the streaming media data of the input source according to a preset image analysis model, AI analysis and identification on the streaming media data of the input source are realized, streaming media data combined with AI analysis and identification results can be obtained, and at the same time, effective control over the identification on the streaming media data of the input source can be realized, thereby further ensuring the reliability of the streaming media service. Moreover, by controlling, by using the streaming media address information, the streaming media service process to identify the streaming media data of the input source according to a preset image analysis model, the streaming media service can directly perform AI analysis and identification on the streaming media data of the input source without interactive transmission with other AI services. Therefore, the delay time caused by the interactive transmission between the streaming media service and the AI service in the related art can be prevented, and the processing time of the streaming media data can be effectively reduced.

In addition, by use of the technical solution according to this embodiment, the streaming media service process can be controlled, by using the streaming media address information, to output the identified streaming media data, and the output of the streaming media data of the input source can be understood, which effectively manages the output of the streaming media data, thereby further ensuring the reliability of the streaming media service.

In addition, by use of the technical solution according to this embodiment, the streaming media service process can be managed according to the acquired processing of the streaming media service process on the streaming media data of the input source, data processing can be understood in a timely manner, and then the streaming media service process can be adjusted in a timely manner according to the data processing, so that the streaming media service can effectively manage the streaming media data processing process of the input source, thereby improving controllability of the streaming media service.

Moreover, the streaming media service process for failed acquisition can be terminated in a timely manner, and the streaming media service process for failed acquisition can be self-checked and recovered according to a certain cycle, so as to optimize resource utilization.

In addition, by use of the technical solution according to this embodiment, according to the acquired remove instruction of the input source, the streaming media service process of the input source can be terminated, and the streaming media data of the input source can be removed. Thus, the streaming media service can directly terminate the operation of pulling data without pulling the streaming media data of the input source and removing the streaming media data of the input source and without interacting with other services other than the streaming media service, which reduces complexity of the service processing process and improves composite performance of streaming media service functions.

In addition, by use of the technical solution according to this embodiment, a streaming media service with a composite service function can be deployed in a streaming media service cluster, cluster deployment can be supported by the streaming media service, and node expansion can be completed without affecting the use of the service. Moreover, time costs and an error rate of deployment of the streaming media service can be further reduced.

Acquisition, storage, use, processing, transmission, provision, and disclosure of users' personal information involved in the technical solutions of the present disclosure comply with relevant laws and regulations, and do not violate public order and moral.

According to embodiments of the present disclosure, the present disclosure further provides an electronic device, a readable storage medium, and a computer program product.

Figure 8:
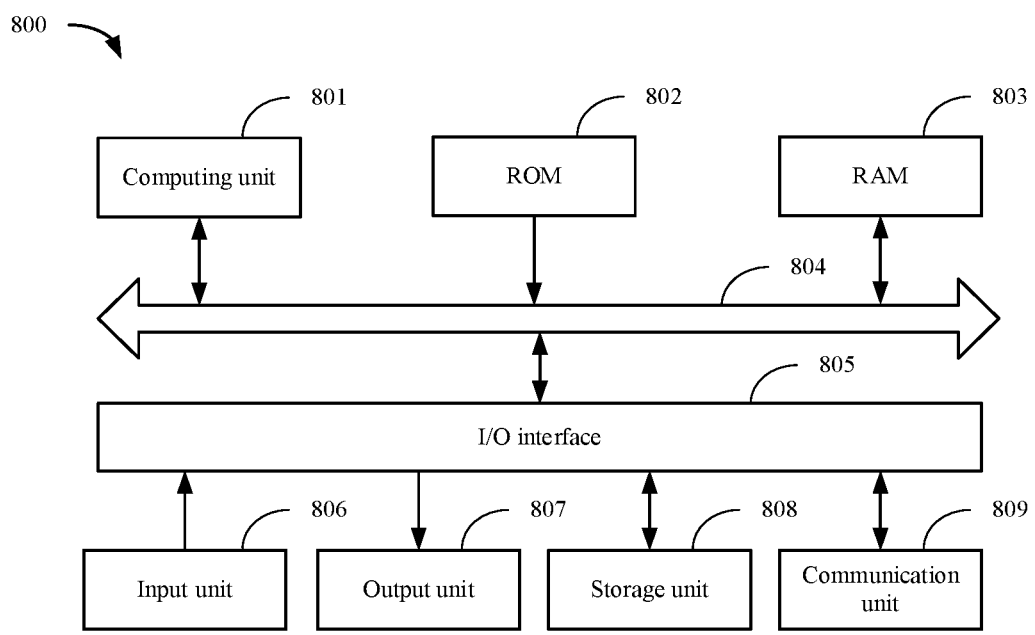
FIG. 8 is a block diagram of an electronic device configured to implement the method for processing a streaming media service according to an embodiment of the present disclosure.

FIG. 8 is a schematic block diagram of an exemplary electronic device 800 configured to implement an embodiment of the present disclosure. The electronic device is intended to represent various forms of digital computers, such as laptops, desktops, workbenches, PDAs, servers, blade servers, mainframe computers and other suitable computers. The electronic device may further represent various forms of mobile devices, such as PDAs, cellular phones, smart phones, wearable devices and other similar computing devices. The components, their connections and relationships, and their functions shown herein are examples only, and are not intended to limit the implementation of the present disclosure as described and/or required herein.

As shown in FIG. 8, the electronic device 800 includes a computing unit 801, which may perform various suitable actions and processing according to a computer program stored in a read-only memory (ROM) 802 or a computer program loaded from a storage unit 808 into a random access memory (RAM) 803. The RAM 803 may also store various programs and data required to operate the electronic device 800. The computing unit 801, the ROM 802 and the RAM 803 are connected to one another by a bus 804. An input/output (I/O) interface 805 is also connected to the bus 804.

A plurality of components in the electronic device 800 are connected to the I/O interface 805, including: an input unit 806, such as a keyboard and a mouse; an output unit 807, such as various displays and speakers; a storage unit 808, such as disks and discs; and a communication unit 809, such as a network card, a modem and a wireless communication transceiver. The communication unit 809 allows the electronic device 800 to exchange information/data with other devices over computer networks such as the Internet and/or various telecommunications networks.

The computing unit 801 may be a variety of general-purpose and/or special-purpose processing components with processing and computing capabilities. Some examples of the computing unit 801 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 801 performs the methods and processing described above, such as the method for processing a streaming media service. For example, in some embodiments, the method for processing a streaming media service may be implemented as a computer software program that is tangibly embodied in a machine-readable medium, such as the storage unit 808. In some embodiments, part or all of a computer program may be loaded and/or installed on the electronic device 800 via the ROM 802 and/or the communication unit 809. One or more steps of the method for processing a streaming media service described above may be performed when the computer program is loaded into the RAM 803 and executed by the computing unit 801. Alternatively, in other embodiments, the computing unit 801 may be configured to perform the method for processing a streaming media service by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, an RAM, an ROM, an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, speech input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN), and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, a distributed system server, or a server combined with blockchain.

It should be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the protection scope of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the protection scope of the present disclosure.

What is claimed is:

1. A method for processing a streaming media service, comprising:
   acquiring registration information of an input source, the registration information comprising process information of a streaming media service process of the input source and streaming media address information of the input source, wherein the input source is registered through a default interface of the streaming media service to generate the registration information of the input source;
   enabling the streaming media service process according to the process information; and
   controlling, by using the streaming media address information, a separate streaming media service process to identify the streaming media data of the input source according to a preset image analysis model, so as to obtain identified streaming media data.

2. The method of claim 1, wherein, after the controlling, by using the streaming media address information, the streaming media service process to identify the streaming media data of the input source according to a preset image analysis model, so as to obtain identified streaming media data, the method further comprises:
   controlling, by using the streaming media address information, the streaming media service process to output the identified streaming media data.

3. The method of claim 1, wherein, after the controlling, by using the streaming media address information, the streaming media service process to process streaming media data of the input source, the method further comprises:
   acquiring the processing of the streaming media service process on the streaming media data of the input source; and
   managing the streaming media service process according to the processing.

4. The method of claim 1, wherein, after the controlling, by using the streaming media address information, the streaming media service process to process streaming media data of the input source, the method further comprises:
   acquiring the processing of the streaming media service process on the streaming media data of the input source; and
   managing the streaming media service process according to the processing.

5. The method of claim 2, wherein, after the controlling, by using the streaming media address information, the streaming media service process to process streaming media data of the input source, the method further comprises:
   acquiring the processing of the streaming media service process on the streaming media data of the input source; and
   managing the streaming media service process according to the processing.

6. The method of claim 3, wherein the managing the streaming media service process according to the processing comprises:
   terminating the streaming media service process of the input source if the processing is a change from successful acquisition to failed acquisition; or
   controlling, according to a preset cycle by using the streaming media address information, the streaming media service process to acquire the streaming media data of the input source if the processing is failed acquisition.

7. The method of claim 1, wherein, after the controlling, by using the streaming media address information, the streaming media service process to process streaming media data of the input source, the method further comprises:
   acquiring a remove instruction of the input source; and
   terminating the streaming media service process of the input source and removing the streaming media data of the input source according to the remove instruction.

8. The method of claim 7, wherein the streaming media service is deployed on a node in a streaming media service cluster.

9. The method of claim 8, wherein
   the streaming media service cluster comprises at least one master node and at least one slave node.

10. An electronic device, comprising:
    at least one processor; and
    a memory communicatively connected with the at least one processor;
    wherein the memory stores instructions executable by the at least one processor, and the instructions are executed by the at least one processor to enable the at least one processor to perform a method for processing a streaming media service, wherein the method comprises:

acquiring registration information of an input source, the registration information comprising process information of a streaming media service process of the input source and streaming media address information of the input source, wherein the input source is registered through a default interface of the streaming media service to generate the registration information of the input source;

enabling the streaming media service process according to the process information; and controlling, by using the streaming media address information, a separate streaming media service process to identify the streaming media data of the input source according to a preset image analysis model, so as to obtain identified streaming media data.

11. The electronic device of claim 10, wherein, after the controlling, by using the streaming media address information, the streaming media service process to identify the streaming media data of the input source according to a preset image analysis model, so as to obtain identified streaming media data, the method further comprises:

controlling, by using the streaming media address information, the streaming media service process to output the identified streaming media data.

12. The electronic device of claim 10, wherein, after the controlling, by using the streaming media address information, the streaming media service process to process streaming media data of the input source, the method further comprises:

acquiring the processing of the streaming media service process on the streaming media data of the input source; and managing the streaming media service process according to the processing.

13. The electronic device of claim 10, wherein, after the controlling, by using the streaming media address information, the streaming media service process to process streaming media data of the input source, the method further comprises:

acquiring the processing of the streaming media service process on the streaming media data of the input source; and managing the streaming media service process according to the processing.

14. The electronic device of claim 12, wherein the managing the streaming media service process according to the processing comprises:

terminating the streaming media service process of the input source if the processing is a change from successful acquisition to failed acquisition; or controlling, according to a preset cycle by using the streaming media address information, the streaming media service process to acquire the streaming media data of the input source if the processing is failed acquisition.

15. The electronic device of claim 10, wherein, after the controlling, by using the streaming media address information, the streaming media service process to process streaming media data of the input source, the method further comprises:

acquiring a remove instruction of the input source; and terminating the streaming media service process of the input source and remove the streaming media data of the input source according to the remove instruction.

16. The electronic device of claim 15, wherein the streaming media service is deployed on a node in a streaming media service cluster.

17. The electronic device of claim 16, wherein the streaming media service cluster comprises at least one master node and at least one slave node.

18. A non-transitory computer readable storage medium with computer instructions stored thereon, wherein the computer instructions are used for causing a method for processing a streaming media service, wherein the method comprises:

acquiring registration information of an input source, the registration information comprising process information of a streaming media service process of the input source and streaming media address information of the input source, wherein the input source is registered through a default interface of the streaming media service to generate the registration information of the input source;

enabling the streaming media service process according to the process information; and controlling, by using the streaming media address information, a separate streaming media service process to identify the streaming media data of the input source according to a preset image analysis model, so as to obtain identified streaming media data.

* * * * *